Dec. 17, 1940.  P. J. NAGLE ET AL  2,224,879
TIRE CHAIN
Filed Feb. 27, 1935  2 Sheets-Sheet 2
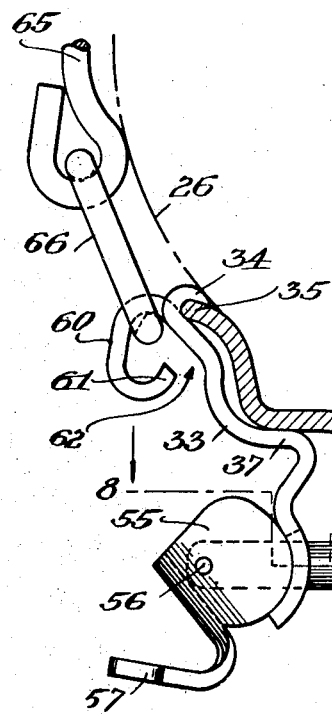
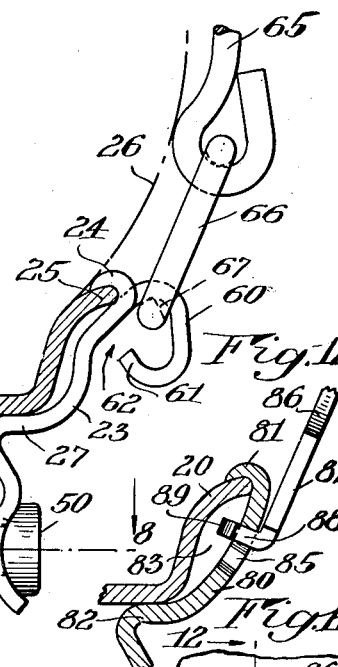
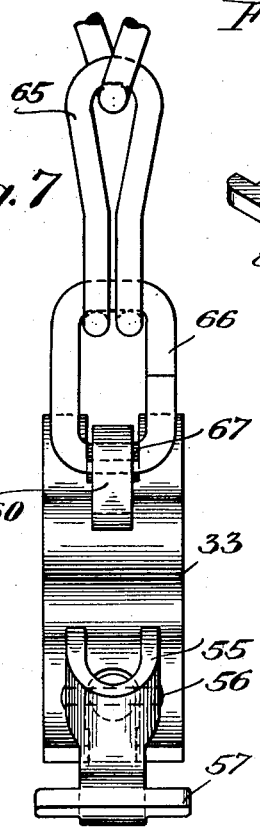
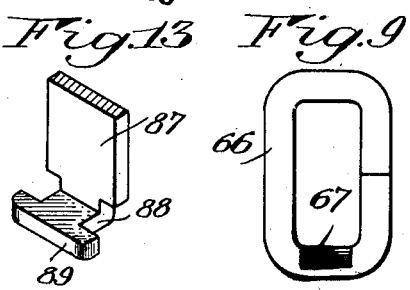
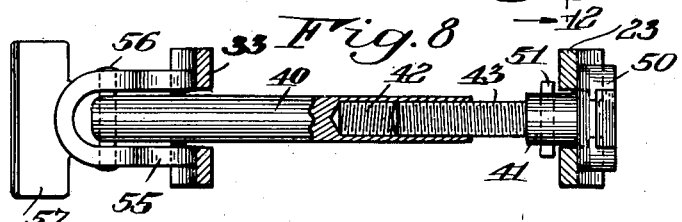
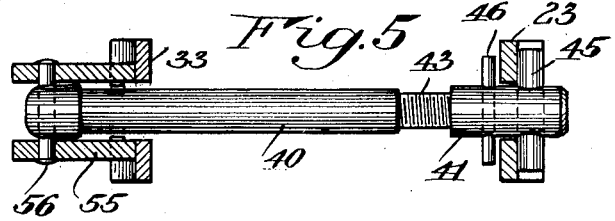
INVENTORS
Peter J. Nagle
Walter J. Englert
BY Edward H. Cumpston
Their ATTORNEY Patented Dec. 17, 1940

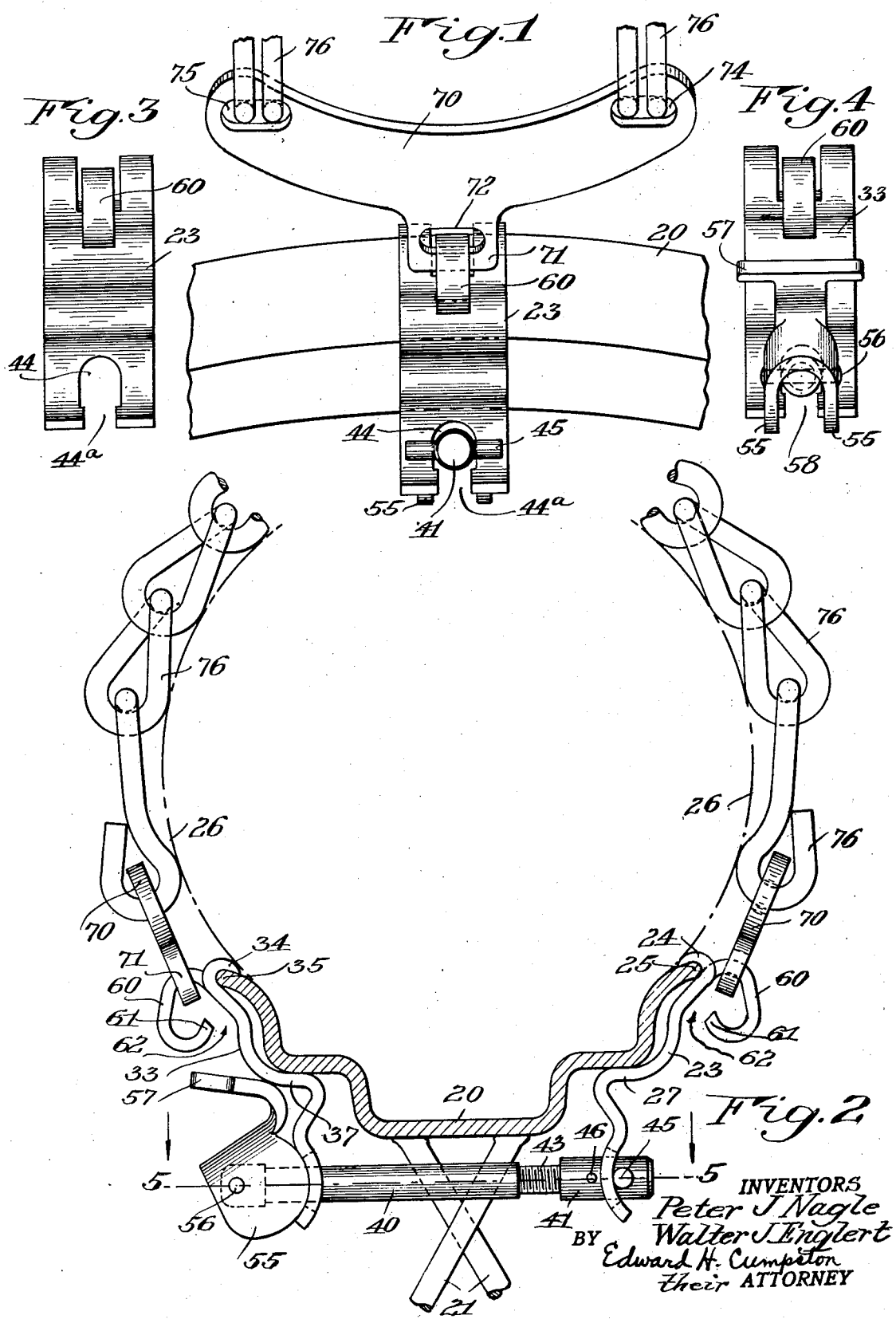

2,224,879

UNITED STATES PATENT OFFICE 2,224,879

TIRE CHAIN

Peter J. Nagle and Walter J. Englert, Rochester, N. Y.; said Englert assignor to said Nagle; Harold J. Nagle, Reginald A. Nagle, and Robert H. Tew, executors of Peter J. Nagle, deceased Application February 27, 1935, Serial No. 8,528

12 Claims. (Cl. 152—233)

This invention relates to articles for application to a vehicle wheel rim and tire, to reduce skidding and to assist the wheel in obtaining traction on the ground, such articles being commonly referred to as tire chains, although according to the present invention an actual chain is not necessarily used.

An object of the invention is to provide a generally improved and more satisfactory construction which may be conveniently applied to and removed from the wheel even by an inexperienced person, with a minimum of difficulty and inconvenience.

Another object of the invention is the provision of such an article so designed and constructed that it may be applied to many of the present day types of wheels in which very small spaces are provided between the spokes or in which the passing of a member through the wheel inwardly of the rim is hampered or restricted by reason of the wheel construction.

A further object is the provision of clamping means which may be attached to the rim and remain permanently thereon during the winter or other desired season of the year, in combination with flexible means (such as a chain or the like) which can be readily attached to and detached from the clamping means when required, to extend across and partially around the tire in order to assist the traction of the wheel.

A still further object is the provision of articles of the kind above mentioned which have provision for suitable adjustment so that they may be applied to wheel rims of various different sizes.

To these and other ends the invention resides in certain improvements and combinations of parts, all as will be hereinafter more fully described, the novel features being pointed out in the claims at the end of the specification.

In the drawings:

Fig. 1 is a fragmentary side elevation of a portion of a wheel rim showing applied thereto a construction in accordance with one embodiment of this invention;

Fig. 2 is a fragmentary cross section through the rim, showing the parts illustrated in Fig. 1 from a different direction;

Fig. 3 is a detail of one of the hook members for engaging the rim, by itself;

Fig. 4 is a view similar to Fig. 3 showing also the connecting means to connect this hook member to the opposite hook member;

Fig. 5 is a section substantially on the line 5—5 of Fig. 2;

Fig. 6 is a view similar to Fig. 2 showing a slightly different form of the invention;

Fig. 7 is a view of some of the parts shown in Fig. 6 from a different direction;

Fig. 8 is a section substantially on the line 8—8 of Fig. 6;

Fig. 9 is a detail side elevation of the form of hanger shown in Figs. 6 and 7;

Fig. 10 is a central section through the hanger shown in Fig. 9;

Fig. 11 is a fragmentary elevation showing the connecting means used on a different form of hanger;

Fig. 12 is a section substantially on the line 12—12 of Fig. 11, and

Fig. 13 is a perspective view of a fragment of the hanger shown in Figs. 11 and 12.

The same reference numerals throughout the several views indicate the same parts.

At 20 there is shown a fragment of a wheel rim of a modern construction now frequently used in automobile wheels, this rim having spokes 21 attached thereto. According to the present invention there is provided a hook member or rim engaging member 23, of metal, for example, having a hook portion 24 to be hooked over one edge 25 of the rim, the end of the hook portion 24 being arranged to enter the small space between this edge of the rim and the tire 26. The member 23 has another portion 27 for engaging the rim at a point inwardly from the edge 24, as shown.

A second hook member or rim engaging member 33 is provided to engage the opposite side of the rim from the member 23. This member 33 may be substantially identical with the member 23, and may have a hook 34 engaging the opposite edge 35 of the rim, similarly to the hook 24 on the other member, and a part 37 for engaging the rim at a point inwardly from its edge.

Means is provided for connecting the two members 23 and 33, to each other to tighten them upon the rim and hold them in place thereon. This means is preferably of relatively small transverse cross section so that it may be inserted through the relatively small spaces between the spokes of many modern wheels or through small holes provided in disk wheels at various points just inwardly from the rim. In the present preferred embodiment, this connecting means comprises a two part member 40 and 41, one part having an internally threaded portion 42 and the other having an externally threaded portion 43 to be screwed into the portion 42, as plainly shown in Figs. 2, 5, 6, and 8. One part of this two part member is connected to one of the rim engaging or hook members and the other part is detachably connected to the other of the rim engaging or hook members.

For example, the part 41 of the two part member may extend through an opening formed by a wide part 44 of a slot at the inner end of the member 23, this slot having also a narrower part 44a extending from the wide part 44 to the edge of the member 23. The slot 44a is narrower than the diameter of the member 41, so that the member 41 can not pass from the wide part 44 into the narrow part 44a. The member 41 may have a cross pin 45 near its outer end to bear against the outer side of the member 23, as plainly seen in Figs. 1, 2, and 5. It may also have another cross pin 46 on the inner side of the member 23 to hold the member 41 from any substantial lengthwise movement through the opening 44 when the parts are unclamped. The opening 44 is sufficiently large with respect to the diameter of the member 41, and the pins 45 and 46 are spaced sufficiently from each other, so that the member 41 has a substantial range of movement in the hole in a manner somewhat similar to a universal joint, and is, in effect, pivotally connected to the member 23 to be capable of moving approximately about the pin 45 as an axis.

Instead of this pin 45, the member 41 might be provided with a head 50 (Figs. 6 and 8) bearing against the outer side of the member 23, and a pin 51 on the inner side of the member 23, similar to the pin 46, to prevent the member 41 from moving through any substantial distance longitudinally through the member 23. In this construction also the member 41 is mounted sufficiently loosely on the member 23 so that it may have a substantial movement similar to that already described in the previous form of the invention, and it is, in effect, pivotally secured to the member 23.

The opposite end of this connecting member comprising the parts 40 and 41 is arranged to be detachably connected in any suitable manner to the other rim engaging member 33. Preferably cam means is provided for effecting this connection, so that the connecting member can be clamped upon the rim engaging or hook members with little effort. For example, a cam 55 may be provided, of somewhat U-shaped form as indicated in Figs. 4, 7, and 8, which cam is pivoted by a pin 56 to the end of the member 40 beyond the member 33. This cam has a curved face eccentric to the pivot 56 of the cam, so that as the cam is oscillated on its pivot by means of the finger piece or handle 57, that portion of the cam face which is in alinement with the axis of the member 40 will move toward or away from the pivot 56. Preferably the greatest distance from the cam face to the pivot is approximately at the center of the cam or at the point of the cam face which is in alinement with the axis of the member 40 in the positions illustrated in Figs. 2 and 6. In both directions from this central portion, the cam face preferably tapers away or moves closer to the pivot 56.

In employing the parts above described in use, the two hook members are engaged with the opposite sides of the rim as shown in Figs. 2 and 6, and the connecting member 40—41 is passed through the wheel from one side thereof to the other, through the spaces between the spokes or through a suitable hole in a disk wheel or the like. The free or cam end of the connecting member is brought to a position radially inwardly (with respect to the wheel) from the inner end of the member 33 and into alinement with a slot 58 (Figs. 3 and 4) extending upwardly from the end of the member 33. Then the end of the member 40 is moved radially outwardly (with respect to the wheel) into the slot 58, this movement being permitted because of the pivotal connection of the member 41 with the member 23. When the member 41 is in proper place within the slot, the cam 44 is rotated by the finger piece 57 to a central position, such as shown in Figs. 2 and 6, whereupon the effective cam edges of the cam will bear upon the member 33 and tend to move it inwardly toward the central plane of the wheel and tend to pull the member 40 outwardly through the member 33, thus likewise tending to pull the other hook member 23 inwardly toward the central plane of the wheel. The inward pull on the inner ends of the two members 23 and 33 will bring the portions 27 and 37 of these members firmly into contact with the rim, and will tend to move the hook portions 24 and 34 outwardly away from each other, but outward movement will be prevented by the hooked engagement of the parts with the rim. Thus the two hook members 23 and 33 will be effectively clamped in position on the wheel rim.

The above mentioned slot 58 in the member 33 may have wide and narrow parts and be identical with the slot 44, 44a in the member 23, so that these two members 23 and 33 may, if desired, be identical with each other. In this event, the member 40 is preferably of somewhat smaller diameter than the member 41, so that it may pass readily through the narrower part of the slot 58, whereas the member 41 could not pass through such narrower part (equivalent to the part 44a of the slot in the member 23).

The clamping parts above described are capable of use on rims of various different sizes or widths. To adjust the connecting means to a wider or narrower rim, it is simply necessary to unclamp the parts and turn the member 40 with respect to the member 41, whereupon the action of the screw threaded parts 42 and 43 will lengthen or shorten the connecting means. The cam, being a double acting cam, can be applied to the member 33 in either of two positions half a turn apart, so that a very fine adjustment is possible because the member 40 need be turned on the member 41 only by half a turn to bring the cam again into a position in which it can be clamped on the member 33. The position shown in Fig. 2 is half a turn away from the position shown in Fig. 6, and it will be noted that in Fig. 2 the handle 57 of the cam lies on the outer side (with reference to the radius of the wheel) of the member 40, while in Fig. 6 the handle 57 lies on the inner side of the member 40, showing that the entire cam and member 40 have been turned a half revolution on the screw 43 from the position shown in Fig. 2.

According to the present invention, one or more suitable flexible members, preferably chains, are detachably connected to the rim engaging members 22 and 23, to extend across and partially around the tire 26. It is contemplated that the clamping parts 23, 33, 40, 41, etc., may be clamped upon the wheel rim more or less permanently, if desired, or at least may remain thereon through the winter driving season. Then the chains or other flexible members can be connected to or disconnected from these clamping parts as desired, without the necessity or going to the bother of clamping and unclamping the hook members each time that a chain is to be removed or put on the tire.

Various arrangements may be provided for detachably connecting the chains or other flexible members to the clamping members. For example, as shown in Figs. 1, 2, 4, 6, and 7, each of the hook members or rim engaging members 23 and 33 may be provided with a portion 60 forming a loop near the outer end of the hook member, the end 61 of this portion 60 being brought around to a position relatively close to the main body of the rim engaging member to provide a relatively narrow or restricted slot 62 between this end 61 and the main body of the rim engaging member. If only a single flexible member is to be connected to the clamp parts, the ends of the chain or other flexible member 65 may be connected to hanger 66 (Figs. 6, 7, 9, and 10) in the form of links made of rod or wire stock having a sufficiently great diameter so that they will not pass through the restricted slots 62. At one definite point, however, the link 66 is reduced in thickness, as by providing a flat spot 67 so arranged that in normal operating position, during the rotation of the wheel, this flat spot is not presented to the slot 62. But when the wheel is stationary and it is desired to remove the chain or other flexible element, the flexible element has sufficient slack in it so that the hanger link 66 can be pulled down to a position where the flat spot 67 is in alinement with the end 61 of the loop 60 and then the flattened portion of the hanger link 66 can be slid through the restricted slot 62 to free the hanger link from the clamp parts. Each hanger link may thus be disconnected from its associated rim engaging member 23 or 33 and the flexible element or chain 65 may thus be removed from the tire. By a reverse operation, the flexible element may be replaced on the tire when desired.

If it is preferred to use more than one chain or other flexible element in connection with each clamp, then a slightly different form of hanger, such as shown in Figs. 1 and 2, may be provided. Here, the hanger is in the form of a bar 70 having a lug or projection 71 on one side of the bar near the center of the bar in a lengthwise direction. This lug has in it a hole 72 which may be engaged over the loop portion 60 of the clamping parts. But the hole 72 is so small with respect to the size of the loop 60, that when the parts are in the position shown in Figs. 1 and 2, the upper edge of the hole will come in contact with the top of the loop 60 before the lower edge of the hole can drop down far enough to be below the end 61 of the loop. Consequently, the parts cannot be disconnected when they are in this position, and it is necessary to swing the hanger 70 outwardly and downwardly from the normal driving position shown in Figs. 1 and 2, to bring the hanger way around to the lower side of the loop 60, after which the parts may be disconnected by passing that part of the lug 71 of the hanger which was within the loop 60, out through the restricted slot 62. There is frequently sufficient slack in the chain or other flexible element to permit this disconnection by pulling all of the slack to one end of the chain and disconnecting one hanger first, after which the other hanger may be easily disconnected. At other times, however, it may be preferred to unclamp the cam 55 and remove one of the rim engaging members from the rim in order to connect or disconnect the chain hanger more readily, after which the clamp parts can again be restored to normal position on the rim.

The hanger 70 has provision for holding as many chains or other flexible elements as desired. In the embodiment shown, the hanger extends in a generally circumferential direction with respect to the wheel and has near one end a hole 74 and near the other end a hole 75, each hole being adapted to interengage with one end of a suitable flexible element such as the chain 76 which, as usual, extends across the tread portion of the tire and partially around the tire.

It will also be noted in Fig. 1 that the hanger 70 is preferably not a straight bar, but is so shaped that the holes 74 and 75 are materially outwardly (in a radial direction with respect to the wheel) from the hole 72. This is advantageous because if one of the cross chains or other flexible members should break in use, thus releasing the pull on one end of the hanger 70, the hanger would have to tilt only a relatively short distance until the hole to which the other or unbroken cross chain was connected, comes into the same diametrical plane with the hole 72, when the parts would once more be in stable condition, and this slight tilting of the hanger 70 would not cause any great lengthening of the chain which was not broken. If the hanger were a plain straight bar, on the other hand, it is apparent that if one chain broke the hanger would have to turn nearly 90° about its connection with the clamp parts before the elements would again be in stable position, and this would cause undue slack in the chain which was not broken.

Still another form of hanger is illustrated in Figs. 11 to 13, inclusive. Here, a fragment of the rim engaging member is indicated at 80, and this may correspond to and be substantially identical with either of the previously described rim engaging members 23 and 33, except that, between its hook end 81 and its rim engaging portion 82 it is bowed outwardly somewhat more than the members 23 and 33, to provide a substantial space 83 between this portion of the member 80 and the rim 20.

In this outwardly bowed portion of the rim engaging member 80 is a slot 85 which, as shown particularly in Fig. 11, has a narrow portion at its outer end and a wider portion at its inner end. The hanger 86 has a portion 87 the end of which is bent over as at 88 and narrowed down, and which has an extreme end 89 somewhat wider or T-shaped, as indicated plainly in Fig. 13, to provide a head which may be passed through the slot 85 and may lie in the space 83. The narrow portion 88 of the hanger will fit within the narrow portion of the slot, but the head 89 is too wide to pass through the narrow portion of the slot, and preferably is also too wide to pass straight through the wide portion of the slot 85, the head being insertable through or removable from this slot only by tilting the hanger and passing first one end of the head and then the other end thereof through the wide part of the slot.

When the parts are in normal operating position, the pull on the hanger 86 caused either by initial tension of the chain or other flexible element, or by centrifugal force during rotation of the wheel, pulls this hanger radially outwardly and keeps the hanger parts in the narrow part of the slot 85 as illustrated in Figs. 11 and 12, in which position the parts are interlocked with each other and the hanger cannot be removed from the rim engaging member. Even if the headed lug 87 of the hanger should move inwardly into the wide part of the slot 85, the parts could not readily become accidentally disconnected, because disconnection can be accomplished only by tilting the hanger to an abnormal angle to move first one end and then the other end of the head 89 out through the slot. If the hanger be pulled forcibly downwardly a short distance from the position shown in Figs. 11 and 12, however, to bring the wide head 89 on the hanger into alinement with the wider part of the slot 85, and if it then be tilted to the required angle, the head may be passed through this wider part of the slot, so that the parts may be disconnected.

Except for this different form of connection between the hanger and the rim clamping parts, the hanger may otherwise be the same as that illustrated in Fig. 1, and may have suitable provision for the connection of one or more cross chains or other flexible elements to extend across and partially around the rim of the tire.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

We claim:

1. A vehicle tire chain construction for application to a rim and tire, comprising a member having a hook-like portion to be hooked over one edge of a rim and an intermediate portion for engaging the rim at a point spaced inwardly from said edge, a second member having a hock-like portion to be hooked over the opposite edge of the rim and an intermediate portion for engaging the rim at a point spaced inwardly from said opposite edge, each of said two members having an inner end portion, connecting means of relatively small cross section connecting the inner end portions of said two members to each other and biasing them toward each other to hold them tightly in hooked engagement with the rim, said connecting means of relatively small cross section forming the only direct connection between said inner end portions of said two members, said inner end portions being otherwise out of contact with each other, said hook-like portions of both of said members being engaged sufficiently far around their respective edges of the rim to hold said portions against lateral movement away from each other when said intermediate portions are engaged with the rim and when the inward pull of said connecting means on said inner end portions tends to rock said hook-like portions outwardly away from each other, and means for detachably connecting one end of a cross chain to one of said members and the other end of a cross chain to the other of said members.

2. A vehicle tire chain construction for application to a rim and tire, comprising a member having a hook-like portion to be hooked over one edge of a rim and a portion for engaging the rim at a point spaced inwardly from said edge, a second member having a hook-like portion to be hooked over the opposite edge of the rim and a portion for engaging the rim at a point spaced inwardly from said opposite edge, a connecting bar of relatively small cross section for connecting one of said members to the other of said members to hold them tightly in hooked engagement with the rim, and cam means for tightening said bar on one of said members.

3. A vehicle tire chain construction for application to a rim and tire, comprising a member having a hook-like portion to be hooked over one edge of a rim and a portion for engaging the rim at a point spaced inwardly from said edge, a second member having a hook-like portion to be hooked over the opposite edge of the rim and a portion for engaging the rim at a point spaced inwardly from said opposite edge, a connecting bar of relatively small cross section for connecting one of said members to the other of said members to hold them tightly in hooked engagement with the rim, screw means for adjusting the length of said bar, and cam means for tightening said bar on one of said members.

4. Tire chain clamping means for engagement with a wheel rim comprising a member having a hook portion to be hooked over one edge of a rim and a portion for engaging the rim at a point materially inwardly from said edge, a second member having a hook portion to be hooked over an opposite edge of the rim and a portion for engaging the rim at a point materially inwardly from said opposite edge, each of said hook portions extending around its associated rim edge and inwardly along the inner surface of the rim sufficiently far to prevent the hook portion from becoming disengaged from the rim without movement having a component in a radially outward direction, connecting means pivotally secured to one of said hook members, and means for detachably securing said connecting means to and tightening it upon the other of said hook members to hold said hook members in hooked relation to a rim.

5. Tire chain clamping means for engagement with a wheel rim comprising a member having a hook portion to be hooked over one edge of a rim and a portion for engaging the rim at a point materially inwardly from said edge, a second member having a hook portion to be hooked over an opposite edge of the rim and a portion for engaging the rim at a point materially inwardly from said opposite edge, an elongated connecting bar having one end connected to one of said hook members, and cam means pivotally secured to said connecting bar adjacent its opposite end for engagement with the other of said hook members to tighten said connecting member upon said hook members for holding the hook members in hooked relation to the rim.

6. Tire chain clamping means for engagement with a wheel rim comprising a member having a hook portion to be hooked over one edge of a rim and a portion for engaging the rim at a point materially inwardly from said edge, a second member having a hook portion to be hooked over an opposite edge of the rim and a portion for engaging the rim at a point materially inwardly from said opposite edge, an elongated connecting bar having one end connected to one of said hook members, cam means pivotally secured to said connecting bar adjacent its opposite end for engagement with the other of said hook members to tighten said connecting member upon said hook members for holding the hook members in hooked relation to the rim, and means for detachably connecting one end of a cross chain to one of said hook members and the other end of a cross chain to the other of said hook members.

7. Tire chain clamping means for engagement with a wheel rim comprising a member having a hook portion to be hooked over one edge of a rim and a portion for engaging the rim at a point materially inwardly from said edge, a second member having a hook portion to be hooked over an opposite edge of the rim and a portion for engaging the rim at a point materially inwardly from said opposite edge, elongated connecting means having one end connected to one of said hook members, screw means for adjusting the length of said connecting means, a cam pivotally mounted on said connecting means adjacent one end thereof for engagement with the other of said hook members to tighten said connecting means upon said hook members for holding the hook members in hooked relation to the rim, and means for detachably connecting one end of a cross chain to one of said hook members and the other end of a cross chain to the other of said hook members.

8. A vehicle tire chain construction for application to a tire and rim of the type having an edge accessible at each side of the tire, comprising a member having a hook-like portion to be hooked over and around one edge of the rim sufficiently far to hold said hook-like portion against disengagement from the rim except by movement having a component in a direction radially outwardly away from the center of rotation of the rim, a second member having a hook-like portion similarly hooked over the opposite edge of the rim, each of said members having an inner end portion spaced a material distance from the inner end portion of the other member, means connecting said inner end portion of one of said members to said inner end portion of the other of said members to bias said inner end portions toward each other and thus to hold both of said members tightly in hooked engagement with the rim, and means for detachably connecting one end of a cross chain to one of said members and the other end of a cross chain to the other of said members.

9. A vehicle tire chain clamp for application to a wheel rim of the type having an edge accessible at each side of the tire, said clamp comprising two members to be applied to opposite sides of the rim, each of said members having a hook-like portion to be hooked over and around one edge of the rim sufficiently far to hold said portion against movement in a direction laterally outwardly from the tire, each of said members having a portion extending from said hook-like portion in a general direction toward the center of the wheel and adapted to bear against the rim at an intermediate point of said portion and to act as a lever fulcrumed against said rim at said intermediate point so that force tending to move the inner ends of said members toward each other will tend to move the outer ends and hook-like portions laterally away from each other, and means connecting said last named portions of the two members to each other to tend to draw the ends of said portions closest to the center of the wheel toward each other, thus clamping said two members firmly to the rim.

10. A tire chain holding clamp for application to a wheel rim of the type having, in axial cross section, a shoulder on each side and outwardly flaring sides beyond said shoulders, said chain holding clamp comprising two members for application to the opposite sides of said rim, each of said members having an inner end portion projecting toward the central axis of the rim beyond the radially innermost portion thereof and having a portion for bearing against said shoulder at a point intermediate the length of said member and having a hook like portion to be hooked over one of the free edges of said rim and extending around said edge to a point inwardly of said edge sufficiently far to prevent disengagement of said hook like portion from said free edge of said rim when said projecting inner end portion of said member is pulled toward the central plane of said wheel rim, and connecting means for pulling said projecting end portions of both of said members toward each other to clamp both of said members firmly to said wheel rim.

11. A tire chain holding clamp for application to a wheel rim of the type having, in axial cross section, a shoulder on each side and outwardly flaring sides beyond said shoulders, said chain holding clamp comprising two members for application to the opposite sides of said rim, each of said members having an inner end portion projecting toward the central axis of the rim beyond the radially innermost portion thereof and having a portion for bearing against said shoulder at a point intermediate the length of said member and having a hook like portion to be hooked over one of the free edges of said rim and extending around said edge and inwardly therefrom along the inner surface of the rim sufficiently far to prevent disengagement of said hook like portion from said free edge of said rim when said projecting inner end portion of said member is pulled toward the central plane of said wheel rim, said projecting inner end portions of said two members being spaced substantially from each other in a direction parallel to said central axis of the rim, and connecting means of relatively small transverse cross section extending from said inner end portion of one of said members to said inner end portion of the other of said members and exerting a tension stress pulling said end portions of the two members toward each other with sufficient force to clamp both of said members firmly to said wheel rim.

12. A tire chain construction including a clamp assembly, a tread chain assembly, and means for detachably connecting said chain assembly to said clamp assembly, said clamp assembly comprising two separate clamping members for application to opposite sides of the rim, said members having inner end portions spaced from each other, said members having intermediate portions bearing against the rim, said members also having hook portions adjacent their outer ends for hooking around the outer edge of the rim and extending inwardly from said edge along the inner surface of the rim, and tension means tending to draw said inner end portions of said members toward each other to cause said hook portions and said intermediate portions of said members to clamp firmly upon said rim.

PETER J. NAGLE.
WALTER J. ENGLERT.